United States Patent
Ghannam

(10) Patent No.: US 9,128,306 B2
(45) Date of Patent: Sep. 8, 2015

(54) SOLID STATE NANO-BASED OPTICAL LOGIC GATE

(75) Inventor: Talal Ghannam, Riyadh (SA)

(73) Assignee: King Saud University, Riyadh (SA)

( * ) Notice: Subject to any disclaimer, the term of this patent is extended or adjusted under 35 U.S.C. 154(b) by 459 days.

(21) Appl. No.: 13/608,062

(22) Filed: Sep. 10, 2012

(65) Prior Publication Data

US 2014/0070121 A1   Mar. 13, 2014

(51) Int. Cl.
*G02F 3/00*   (2006.01)

(52) U.S. Cl.
CPC .............. *G02F 3/00* (2013.01); *G02F 2203/10* (2013.01)

(58) Field of Classification Search
None
See application file for complete search history.

(56) References Cited

U.S. PATENT DOCUMENTS

| | | | |
|---|---|---|---|
| 6,628,453 | B2 | 9/2003 | Ham |
| 6,917,431 | B2 | 7/2005 | Soljacic et al. |
| 6,937,804 | B2 * | 8/2005 | McCoy et al. ............. 385/122 |
| 7,076,138 | B2 | 7/2006 | Rupasov et al. |
| 7,755,821 | B2 | 7/2010 | Ham |
| 7,831,117 | B1 | 11/2010 | Song |
| 8,031,985 | B2 | 10/2011 | Hochberg et al. |
| 2004/0156407 | A1 * | 8/2004 | Beausoleil et al. ............. 372/43 |
| 2005/0185686 | A1 | 8/2005 | Rupasov et al. |
| 2009/0196561 | A1 * | 8/2009 | Hyde et al. ............. 385/129 |
| 2009/0297094 | A1 | 12/2009 | Hochberg et al. |

FOREIGN PATENT DOCUMENTS

| | | |
|---|---|---|
| CN | 101251701 A | 8/2008 |
| JP | 08095109 A | 4/1996 |
| JP | 02011209404 A | 10/2011 |
| WO | 01/04693 A2 | 1/2001 |

OTHER PUBLICATIONS

T. Ghannam, 'Modulated zero-area solitary pulses: properties and applications', Appl. Opt., vol. 52, No. 25, Sep. 1, 2013, pp. 6383-6389.*
Pizzini et al., S., "Time-Resolved X-Ray Magnetic Circular Dichroism—A Selective Probe of Magnetization Dynamics on Nanosecond Timescales," Topics Appl. Phys. 87, 155-185 (2003).
Biancardo et al., M. "A potential and ion switched molecular photonic logic gate," Chemical Communications, 3918-3920, (2005).
Rosenthal et al., A.S., "Optical solitary waves in three-level media: effects of different dipole moments," J. Opt. Soc. Am. B, vol. 25, No. 4, 645-650 (2008).
Li et al., Z., "All-optical logic gates using a semiconductor optical amplifier assisted by an optical filter," Electronics Letters, vol. 41, No. 25 (2005).

* cited by examiner

*Primary Examiner* — Arnel C Lavarias
(74) *Attorney, Agent, or Firm* — Lowe Hauptman & Ham, LLP

(57) ABSTRACT

A logic gate is disclosed having a photonic or polaritonic band gap medium and a plurality of nano particles, atoms or artificial atoms are disposed in the band gap medium. Two coupled electromagnetic pulses are propagated within the medium and produce two output pulses. The output pulses are detected or sensed and a third external electronic field controls the relative velocities of the two output pulses. A method for producing a time delay of an electromagnetic pulse is also disclosed.

9 Claims, 2 Drawing Sheets

SOLID STATE NANO-BASED OPTICAL LOGIC GATE

FIELD OF THE INVENTION

This invention relates to a solid state nano-based optical logic gate and more particularly to an optical logic gate that includes an active band gap medium and a plurality of nano particles, homogeneous atoms or artificial atoms (quantum dots). The invention also relates to a method for producing a time delay in electromagnetic pulses.

BACKGROUND FOR THE INVENTION

There are many different approaches to optical logic gates. For example, most optical logic gates are based on non-linear effects in optical fiber or in semiconductors. Most of these optical logic gates are based on interoferometric structures requiring a resonator and several structures to be coupled together to produce a complicated system.

Another technique includes molecular photonic gates that have shown promising results. However, these systems and methods have a drawback i.e., a majority work in a liquid state.

The above methods have switching times of around 10 to 100 ps wherein one (1) ps equals $10^{-12}$ seconds.

The systems and methods disclosed herein offer a different approach for producing optical logic gates then those mentioned above. Such systems and methods disclosed herein do not require a resonator structure. Accordingly, such systems and methods are much simpler, more condensed and work entirely in a solid state. Further, the systems operating time is theoretically very close to the above-mentioned methods around 100 ps more or less depending on the technology used.

Background for the present approach is disclosed in the following three U.S. patent application Publications and one U.S. patent. For example, a U.S. Patent Application Publication No. 2004/0156407 discloses quantum information processing using an electromagnetically induced transparency. This publication of Beausoleil et al. describes methods using photons and four-level matter systems in electromagnetically induced transparency (EIT) arrangements for one and two-qubit quantum gates, two-photon phase shifters and Bell State measurement devices. Further, as described electromagnetic pulses are propagated within a medium of two dipole moments of a three energy level system.

A second U.S. Patent Application Publication No. 2005/0185686 of Rupasov et al. describes nanophotonic devices based on quantum systems embedded in frequency band gap medium. The publication describes a system that is made of either atoms or artificial atoms or nano particles that have three energy levels. The publication describes nanophonic materials and devices for both classical and quantum optical signal processing, transmission, amplification and generation of light which are based on a set of quantum systems having discrete energy levels such as atoms, molecules, or quantum dots embedded in a frequency band gap medium such as artificial photonic crystals (photonic band gap materials) or natural frequency dispersive media, such as ionic molecular crystals or semiconductors exhibiting a frequency (photonic) band gap for propagating electromagnetic modes coupled to optical transitions in the quantum systems.

Further a U.S. Pat. No. 7,076,138 of Rupasov et al. describes nanophotonic devices based on quantum systems embedded in frequency band gap medium. The publication describes nanophotonic materials and devices for both classical and quantum optical signal processing, transmission, amplification and generation of light. The description is based on a set of quantum systems having discrete energy levels such as atoms, molecules or quantum dots embedded in a frequency band gap medium such as artificial photonic crystals (photonic band gap materials) or natural frequency dispersive media such as ionic crystals, molecular crystals, or semiconductors exhibiting a frequency (photonic) band gap for propagating electromagnetic modes coupled to optical transitions in the quantum systems.

Still further, a U.S. Patent Application Publication No. 2009/0297094 of Hochberg et al. describes an All-Optical Modulation And Switching With Patterned Optically Absorbing Polymers, in which AND, OR, XOR and XNOR work as logic gates. The publication describes processing devices that include patterned optically active polymers and are constructed according to principles of the invention to include at least one optical input port and at least one optical output port configured to accept optical input signals and provide optical output signals. The devices include optically active material such as organic polymers that interact with illumination at a first wavelength to change at least one optical property in a non-linear manner. The optically active polymer can be placed adjacent one or more waveguides that allow the input illumination to propagate. As the optical property of the optically active material is changed by the incident illumination, the propagating illumination undergoes a modulation or change in phase thereby providing an optical output signal having a desired relation to the optical input signal such as the result of a logical or a computational operation.

Notwithstanding the above, it is presently believed that there is a need and a potential commercial market for a new solid state nano-based optical logic gate and more particularly to an optical logic gate that includes an active band gap medium and a plurality of nano particles, homogeneous atoms or artificial atoms (quantum dots).

SUMMARY OF THE INVENTION

Briefly the present invention contemplates a solid nano-based optical logic gate that is free of resonator structure. The logic gate comprises or consists of an active band gap medium and a plurality of nano particles, homogeneous atoms and/or artificial atoms (quantum dots). It is also believed that the need and potential commercial market has particularly high potential for the devices and methods of the present invention wherein the active band gap medium is selected from the group consisting of polaritonic and photonic band gap mediums.

The plurality of nano particles homogeneous atoms and artificial atoms are embedded in the medium and wherein the nano particles, homogeneous atoms or artificial atoms have three active energy levels corresponding to two frequencies $\omega a$ and $\omega b$ and two dipole moments of values Pa and Pb. The logic gate also includes means for propagating two coupled electromagnetic pulses within the medium for interacting with the two dipole moments of the three energy level system to thereby provide two output pulses.

Two photodetectors are provided for sensing the two coupled output pulses and their relative speeds wherein the sensor registers one (1) when the two outputs arrive together and zero (0) when they are temporarily separated. In addition, a third external electric field is applied to and configured to control the relative velocities of the two output pulses to control the logic gate. In a preferred embodiment of the invention, the two electromagnetic pulses are of the Modulated Zero-Pulse Area Type and a factor β is calculated from $4[\omega a \times pa/\omega b \times pb]$ so that when the value of β is less than or close to one (1) the a-pulse will propagate slower than the b-pulse and the bigger beta is the less the time delay between the two pulses.

The invention will now be described in connection with the accompanying drawings.

DESCRIPTION OF THE PREFERRED EMBODIMENTS OF THE INVENTION

The logic gate in accordance with the present invention comprises or consists of an active band gap medium and a plurality of nano particles, homogeneous atoms and/or artificial atoms (quantum dots). It is believed that there is a commercial market with particularly high potential for these devices and methods wherein the active band gap medium is selected from the group consisting of polaritonic and photonic band gap mediums.

Photonic and polaritonic band gap mediums share the characteristic of forbidding light pulses of specific frequencies from propagating therethrough. The difference between the two is that in the case of photonic band gap materials, it is only the interaction of the photons of the pulses with the atoms of the photon band gap materials that is taking place. In the polaritonic materials, however, the interaction involves the photons of the pulses, the atoms of the photon band gap material, and the vibrations of the lattice of the photon band gap materials, known as phonon-polaritons. The photons of specific frequencies will couple to the vibrational modes of the photon band gap lattice forming one combined state.

Band gap materials can be made of homogeneous materials like in Silicon Carbide, or can be synthetic as in photonic crystals. Polaritonic band gap materials can be made of SiC (Silicon Carbide) or MgO (Magnesium Oxide). Photonic band gap materials are usually manufactured by manipulating photonic crystals. They can be synthesized using many techniques and with different materials. For example they can be made of silicon colloidal crystals that are embedded within a single crystal silicon wafer.

Nano particles are made of several atoms, mainly of one homogeneous material, like silver or gold, having sizes and shapes depending on the desired properties of such particles. In the present case, Applicants used silver nano particles. Quantum dots, on the other hand, are entities made mainly of semiconducting materials where one electron, or more, is confined into one three dimensional "well" and where the excitation energy of these electrons can be controlled.

Regarding the electromagnetic pulses, they can be generated using many different techniques based on the experimentalist or manufacturer's will and on the technical feasibility. Nevertheless, one way of generating these pulses could be by my previous patent (EP11196020.9) where laser pulses are generated from a nano laser made of a quantum dot and a nano particle.

Figure 1:
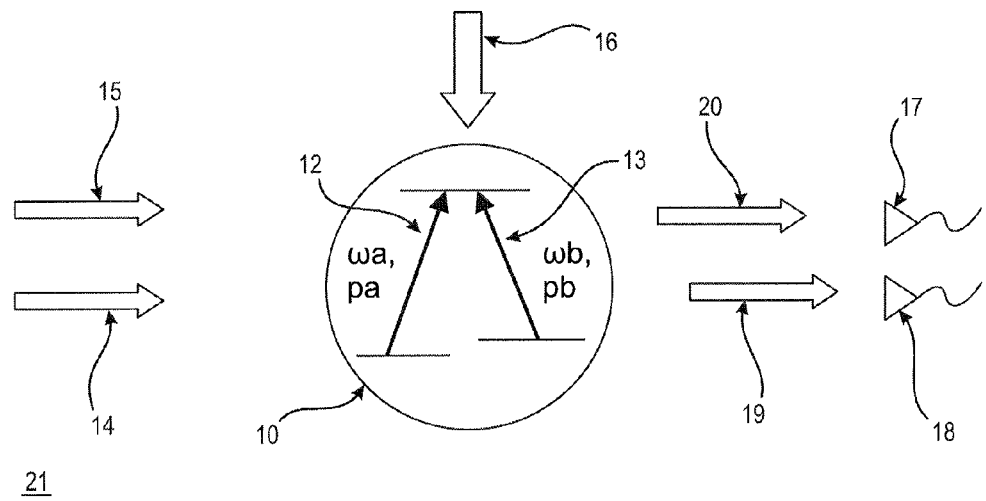
FIG. 1 is a schematic illustration of a system in accordance with the principles of the present invention.
Figure 2:
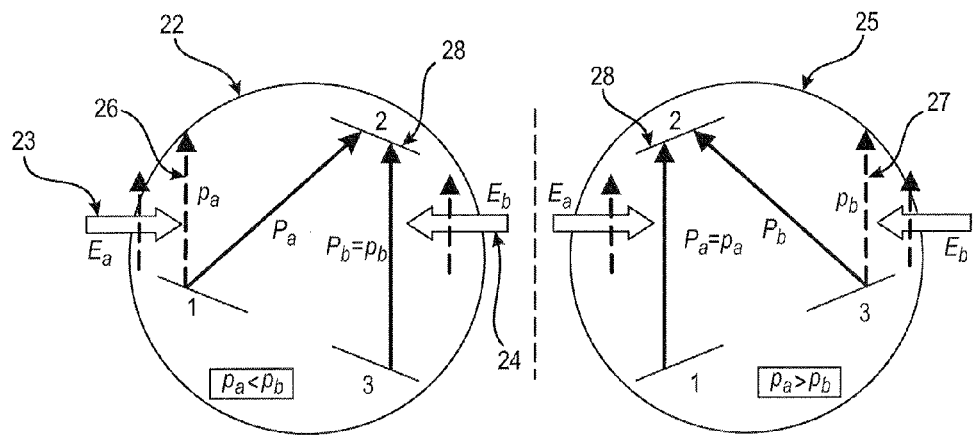
FIG. 2 is a schematic illustration of an individual nano particle or artificial atom or quantum dots interacting with electromagnetic pulses for two spatial orientations.
Figure 3:
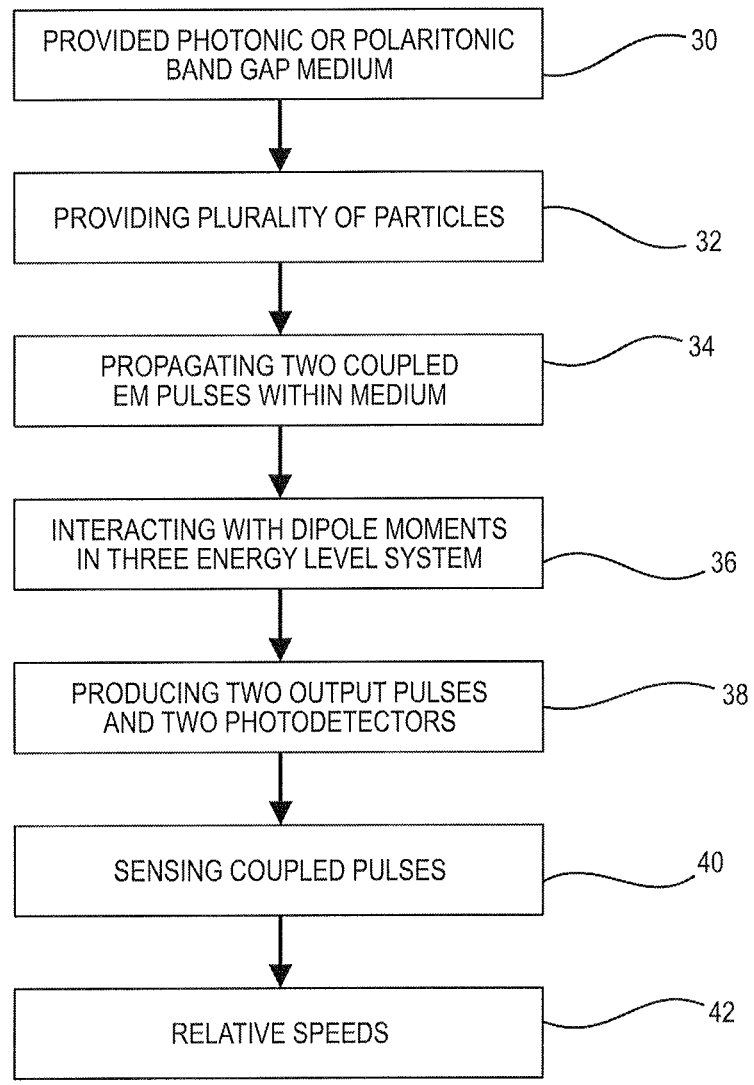
FIG. 3 is a flowchart illustrating a method for producing a time delay of an electromagnetic pulse.

As illustrated in FIGS. 1 and 2 an active element 10 i.e., a nano particle, atom or artificial atom (quantum dot) has three energy levels wherein step 12 indicates the energy level corresponding to a frequency $\omega a$ and dipole moment Pa. The energy level corresponds to a frequency level $\omega b$ and dipole moment Pb is indicated by 13. An incoming a-pulse 14 and incoming b-pulse 15 is controlled by an electromagnetic pulse 16. A pulse sensor or photodetector 18 for the a-pulse and a pulse sensor or photodetector 17 for a b-pulse are provided for detecting the speed of an outgoing a-pulse 19 and outgoing b-pulse 20, respectively. The surrounding medium is indicated by numeral 21.

The active element 10 (FIG. 1) with a first orientation 22 is illustrated in FIG. 2. An incoming a-pulse 23 with its polarization direction indicated and an incoming b-pulse 24 with its b-pulse with its polarization direction indicated are also illustrated in FIG. 2. In this figure, the active element 25 with a second or different orientation is shown. Nevertheless, it should be recognized that the orientation may be the same. An active component of the dipole moment pa 26 is parallel to the polarization of the a-pulse while an active component 27 of the dipole moment pb of the b-pulse are indicated in FIG. 2. Finally, the three energy levels 28 are indicated.

In a preferred embodiment of the invention, two electromagnetic pulses are propagated through a medium such as a photonic band gap medium. The pulses are preferably coupled pulses of the Modulated Zero-Pulse Area Type (MZA Type). An active element made of single or an array of either nano particles, atoms or artificial atoms that will interact with incoming electromagnetic pulses and a third controlling electromagnetic field are provided that will effect the energetic configuration of the active elements and hence control the speeds of two incoming electromagnetic pulses. Optical sensors or photodetectors receive the processed signals of the two electromagnetic pulses. Further, it is presently believed that the above-mentioned configuration can be put in other mediums or configurations to produce the results desired by the experimenters or manufacturers.

The invention also contemplates a method for producing a time delay of an electromagnetic pulse. The method comprises or consists of the following steps:

Providing an active band gap medium selected from the group consisting of photonic and polaritonic band gap mediums in step 30 and a plurality of particles selected from the group consisting of homogeneous atoms, artificial atoms and nano particles in step 32. The plurality of particles is embedded in the medium 30 and when the particles having three energy levels corresponds to two frequencies $\omega a$ and $\omega b$ and two dipole moments of values Pa and Pb.

The method also comprises or consists of propagating two coupled electromagnetic pulses within the media in step 34 and in step 36 interacting with the dipole moments in said three energy level system to thereby produce two output pulses in step 38. Two sensors or photodetectors are provided in step 40 for sensing the coupled pulses and their relative speeds in step 42 and wherein the sensors register one (1) when the two outputs arrived at the same time and zero (0) when they are temporarily separated.

In a preferred embodiment of the invention the electromagnetic pulses are of the Modulated Zero-Pulse Area Type and a factor $\beta$ is calculated from $4[\omega a \times pa/\omega b \times pb]$ so that when the value of $\beta$ is less than or close to 1, the a-pulse will propagate more slowly then the b-pulse and the bigger beta is the less time delay between the two pulses. Finally, the two photodetectors are calibrated with respect to the two emerging electronic pulses to obtain a time delay between them in order to induce or eliminate the time delay.

As stated above, the disclosed system has shown an ability to slow one electromagnetic pulse in respect to the other depending on the value of the factor $\beta=4[\omega a \times pa/\omega b \times pb]$ in regular pulses contrary to MZA pulses having an effective non-zero area have exhibited, theoretically speaking, no relative time delay between the two pulses.

The factor β by applying a third external electromagnetic field to the system can be controlled. This controlling field can be used in two ways:

1. By directly affecting the energy separations (ωa, ωb) and/or the dipole moments (pa, pb) of the atoms/artificial atoms/nano particles; or 2. By spatially rotating the nano-particles or artificial atoms. By changing the orientation of the active element, the direction of its transitional dipole moment (Pa, Pb) compared to the direction of the polarization of the electromagnetic pulses will change. Thus, the magnitudes of the components of the dipole moments that are actually interacting with the electromagnetic pulses (pa, pb) will also change, getting smaller or bigger depending on the mutual orientation as shown in FIG. 2. Thus, if one rotates the nano particle such that pa gets bigger and pb gets smaller, the factor β will get smaller too, leading to a change in the relative group velocity of the pulses.

Optical sensors (or photo-detectors) that are calibrated to the two emerging electromagnetic pulses will be capable of detecting the time delay between them. Therefore, using the controlling field, one can induce or eliminate the time delay of the two pulses at will and, consequently, the two sensors will either click simultaneously or with a certain delay. Thus the system can work as an optical logic gate that is with the sensors registering 1, for example, when the two pulses arrive together, and 0 when they are temporarily separated.

In the alternative, the system can work as AND, OR, XOR, XNOR etc. logic gates as follows; when the two pulses arrive together at the sensors, they register [1, 1] or [0, 0]; when both are delayed with respect to the sensors clock, they register [0, 0] or [1, 1]; and when one pulse is delayed in comparison to the other, they register [1, 0] or [0, 1] depending on which pulse is delayed. The mutual slowing of the pulses can be achieved by changing the energy levels of the active medium in respect to the energies of the band gap of the photon band gap medium. The speeds of the two pulses will differ depending on whether the energies of the active medium are on or outside the energy band edges of the photon band gap material.

The effective time of the operation of the gate depends on three factors:

1—The response time of the sensors. Sensors are usually very fast, on the order of 10 ps or less.

2—The time delay between the two pulses. This can be as small as desired.

3—The effective time for the nano particles or the atom/artificial-atom to respond to the external field, either by directly changing their energy separation or by rotation.

For the direct affecting method, the time is around 1 ps, more or less, depending on the materials and techniques used. The rotational method of the nano particle/artificial atoms is a bit longer. It can be achieved within a frame of time around 100 ps [2].

The response time of the system is proportional to the slowest of these times, which is around $10^{-10}$ sec for the rotational technique. However these values are not necessarily fixed, as new research could lead to much better results, e.g. faster rotation of the nano-particle.

Embedding the system in photon gap band materials have shown better results in producing a time delay between the two pulses. However, this is not a necessary condition.

While the invention has been disclosed in connection with its preferred embodiments it should be recognized that changes and modifications may be made therein without departing from the scope of the claims.

What is claimed is:

1. A solid state nano-based optical logic gate that is free of a resonator structure, said logic gate comprising:
   an active band gap medium;
   a plurality of nano particles, homogeneous atoms or artificial atoms embedded in said medium and wherein said nano particles, homogeneous atoms or artificial atoms have three active energy levels corresponding to two frequencies ωa and ωb and two dipole moments of values Pa and Pb;
   two coupled electromagnetic pulses propagating within said medium and interacting with said two dipole moments of said three energy level systems to thereby produce two output pulses;
   two photodetectors for sensing the two coupled output pulses and their relative speeds wherein sensors register 1 when two outputs arrive together and 0 when they are temporarily separated; and
   a third external electronic field applied to and configured to control relative velocities of the two output pulses to control said logic gate.

2. A solid state nano-based optical logic gate that is free of a resonator structure according to claim 1, in which said active band gap medium is selected from the group consisting of photonic and polaritonic band gap mediums.

3. A solid state nano-based optical logic gate that is free of a resonator structure according to claim 2, in which said active band gap is a photonic band gap medium.

4. A solid state nano-based optical logic gate that is free of a resonator structure according to claim 2, in which said active band gap is a polaritonic band gap medium.

5. A solid state nano-based optical logic gate that is free of a resonator structure according to claim 2, in which said two electromagnetic pulses are of a Modulated Zero-Pulse Area Type and a factor β is calculated from 4[ωa×pa/ωb×pb], wherein both pa and pb are dipole moments so that when the value of β is less than or close to 1 an a-pulse will propagate slower than a b-pulse and the bigger beta is the less a time delay between the two pulses; and
   in which said two photodetectors are calibrated to the two emerging electromagnetic pulses to obtain the time delay between them so that one can induce or eliminate the time delay and the two sensors work as an optical logic gate.

6. A method for producing a time delay of an electromagnetic pulse comprising the steps of:
   providing an active band gap medium selected from the group consisting of photonic and polaritonic band gap medium;
   providing a plurality of particles selected from the group consisting of homogeneous atoms, artificial atoms and nano particles embedded in said medium and wherein said particles have three energy levels corresponding to two frequencies ωa and ωb and two dipole moments of values Pa and Pb;
   propagating two coupled electromagnetic pulses within said medium and interacts with said pulses with said dipole moment on said three energy level systems to thereby produce two output pulses;
   providing two photodetectors and sensing the two coupled output pulses with said two photodetectors and their relative speeds and wherein sensors register 1 when the two outputs arrive together and 0 when they are temporarily separated; and providing a third external electronic field applied to and configured to control relative velocities of the two output pulses.

7. A method for producing a time delay of an electromagnetic pulse according to claim 6, in which said two electromagnetic pulses are of a Modulated Zero-Pulse Area Type and a factor β is calculated from 4[ωa×pa/ωb×pb], wherein both pa and pb are dipole moments so that when the value of β is less than or close to 1 an a-pulse will propagate slower than a b-pulse and the bigger beta is the less a time delay between the two pulses.

8. A method for producing a time delay of an electromagnetic pulse according to claim 6, in which said two photodetectors are calibrated with respect to the two emerging electronic pulses to obtain the time delay between them in order to induce or eliminate the time delay.

9. A method for producing a time delay of an electromagnetic pulse consisting of the following steps:
providing an active band gap medium selected from the group consisting of photonic and polaritonic band gap medium;
providing a plurality of particles selected from the group consisting of homogeneous atoms, quantum dots and nano particles embedded in said medium and wherein said particles have three energy levels corresponding to two frequencies ωa and ωb and two dipole moments of values dipole moment Pa and dipole moment Pb;
propagating two coupled electromagnetic pulses within said medium and interacts with said dipole moment in said three energy level systems to thereby produce two output pulses;
providing two photodetectors and sensing the two coupled pulses and their relative speed and wherein sensors register 1 when the two outputs arrive together and 0 when they are temporarily separated; and
providing a third external electronic field equal to and configured to control relative velocities of the two output pulses;
in which said two electromagnetic pulses are of a Modulated Zero-Pulse Area Type and a factor β is calculated from 4[ωa×pa/ωb×pb] so that when the value of β is less than or close to 1 an a-pulse will propagate more slowly than a b-pulse and the bigger beta is the less a time delay between the two pulses; and
in which said two photodetectors are calibrated with respect to the two emerging electronic pulses to obtain the time delay between them in order to induce or eliminate the time delay.

* * * * *